Patented Apr. 17, 1945

2,373,988

UNITED STATES PATENT OFFICE 2,373,988

METHOD OF PACKING TUNA FISH

Kristian Wuori and Gearhart K. Wuori, Astoria, Oreg.

No Drawing. Application October 23, 1943, Serial No. 507,478

4 Claims. (Cl. 99—188)

This invention relates generally to the packing of fish and particularly to the method of canning tuna fish.

The main object of this invention is to devise a method whereby tuna fish may be more economically canned and the resulting pack be of a much higher quality.

Before entering into an explanation of our invention, it is stated that under the present and almost uniform practice, the tuna fish is first relieved of its head and entrails and washed, then subjected to cooking process for three and a half or four hours at 15 pounds pressure approximating 250° F.

It is then allowed to cool for twenty-four hours, then cleaned by scraping of the skin, then filleted and quartered to expose the dark meat, then removing the dark meat, then cutting the white meat to canning size, and then further retorting it for eighty minutes at 15 pounds pressure in sealed cans to which cottonseed oil has previously been added to replace the natural oil extracted during the preliminary retorting.

With our process, the fish is first cleaned by removing the head and entrails and two large fins, then skinned starting from the neck and drawing it downwardly toward the tail, then removing the tail, then filleting and quartering to expose the dark meat and removing the dark meat and the larger bones, then cutting the white meat to canning size and salting and sealing in cans and retorting or cooking same for an hour and forty minutes at 15 pounds pressure at a temperature of 250 degrees F. No oil is added to the fish as all of the natural fish oil is retained.

Whereas, the first described process is almost universely used, it has several severe drawbacks. First, it consumes five hours of processing time as compared with one hour and forty minutes at a like temperature as required by the applicant's process. Secondly, the abnormally long cooking period now employed not only wastes time and heat, but it extracts a natural oil from the fish. Although this oil is useful for other purposes, it is badly lacking in the present day canned tuna, and cottonseed oil which is used to replace same is a poor substitute for the natural fish oil.

A more serious objection however, rests from the processing of the white meat in the presence of the so called dark meat which has a stronger and to many people an objectionable flavor. This dark meat flavor is imparted not only to the white meat, but also to the extracted oils.

It can be seen from the foregoing, that by the employment of our process, there is secured not only a material saving of time and fuel, but the quality of the pack is tremendously improved and the need for cottonseed oil as a replacement is eliminated.

We claim:

1. A method of canning tuna fish consisting of progressively removing head, entrails, and skin from the fish, then removing the dark meat therefrom, then sealing the meat in cans, and then processing for approximately one hour and forty minutes at 15 pounds steam pressure.

2. A method of canning tuna fish consisting of progressively removing from the fish all except the white meat and smaller bones, then sealing the white meat in closed cans and then processing said white meat for approximately one hour and forty minutes at a temperature of approximately 250 degrees F.

3. A method of canning tuna fish consisting of progressively cleaning the fish by removing the head, entrails and fins, then skinning the fish, then removing the tail, then filleting and quartering the meat in a manner to expose the bones and dark meet therein, then removing all of the dark meat, then placing the meat in containers and sealing same therein, then subjecting the meat to a temperature of approximately 250° F. for approximately one hour and forty minutes.

4. A method of canning tuna fish consisting of progressively removing from the fish all of the skin and dark meat, sealing same in closed cans and then processing for approximately an hour and forty minutes at 250 degrees F.

KRISTIAN WUORI.
GEARHART K. WUORI.